(12) United States Patent
Leclerc

(10) Patent No.: US 11,921,000 B2
(45) Date of Patent: Mar. 5, 2024

(54) VISUAL FIBER FINDER FOR SEQUENCING OPTICAL FIBER TESTING

(71) Applicant: EXFO Inc., Quebec (CA)

(72) Inventor: Michel Leclerc, Quebec (CA)

(73) Assignee: EXFO Inc., Quebec (CA)

( * ) Notice: Subject to any disclaimer, the term of this patent is extended or adjusted under 35 U.S.C. 154(b) by 0 days.

(21) Appl. No.: 17/648,866

(22) Filed: Jan. 25, 2022

(65) Prior Publication Data

US 2022/0268665 A1  Aug. 25, 2022

Related U.S. Application Data

(60) Provisional application No. 63/153,713, filed on Feb. 25, 2021.

(51) Int. Cl.
*G01M 11/00* (2006.01)

(52) U.S. Cl.
CPC .................... *G01M 11/33* (2013.01)

(58) Field of Classification Search
CPC .................................................... G01M 11/33
USPC ......................................................... 356/73.1
See application file for complete search history.

(56) References Cited

U.S. PATENT DOCUMENTS

| 5,455,672 | A | 10/1995 | Lamonde et al. |
| 9,184,833 | B2 | 11/2015 | Kassler |
| 9,485,016 | B2 | 11/2016 | Kassler |
| 10,161,829 | B2 | 12/2018 | Brillhart et al. |
| 10,591,385 | B2 | 3/2020 | Perron et al. |
| 11,169,051 | B2 | 11/2021 | Xu |
| 2012/0236294 | A1* | 9/2012 | Smith ................ G01M 11/3109 356/73.1 |
| 2016/0069774 | A1* | 3/2016 | Hayashi ............... H04B 10/071 356/73.1 |
| 2016/0356670 | A1* | 12/2016 | Brillhart ............... H04B 10/071 |

OTHER PUBLICATIONS

FOT-930 MaxTester Multifunction Loss Tester. Spec sheet [online]. EXFO inc. Printed in Canada 17/03. Retrieved from the Internet: <URL: https://exfoprodstorage.blob.core.windows.net/media/8237/fot-93019-ang-discontinued.pdf>.

* cited by examiner

*Primary Examiner* — Sunghee Y Gray
(74) *Attorney, Agent, or Firm* — Helene Chotard

(57) ABSTRACT

There is provided optical power loss measurement method and system for that aims to provide a more productive way to perform optical power loss measurements involving test units typically at different locations. Visual fiber finder light can be used to assist the user at the other end of the optical fiber link under test in identifying where to connect the power meter unit. A visual fiber finder light and test light are combined on a same output port of a light source unit at one end of the optical fiber link under test wherein visual fiber finder light is interleaved with test light in a cyclic sequence so that both are not active at the same time. The optical power meter unit determines a time slot when to measure test light in accordance with the given cyclic sequence.

14 Claims, 13 Drawing Sheets

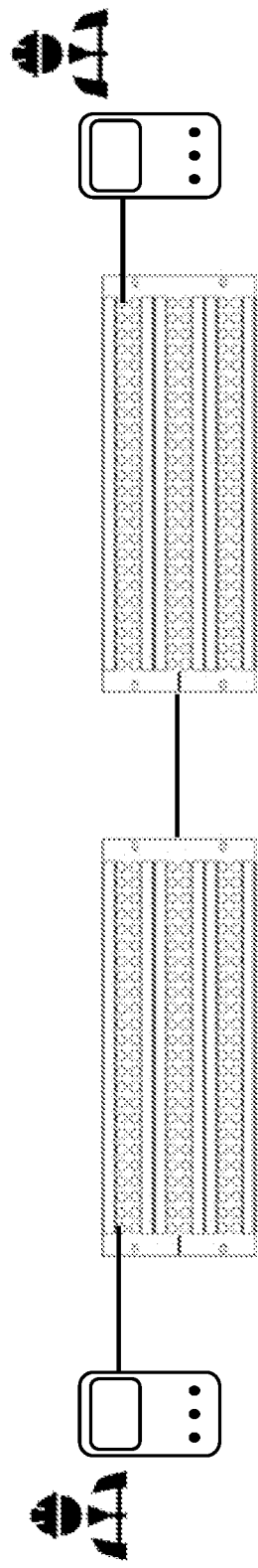
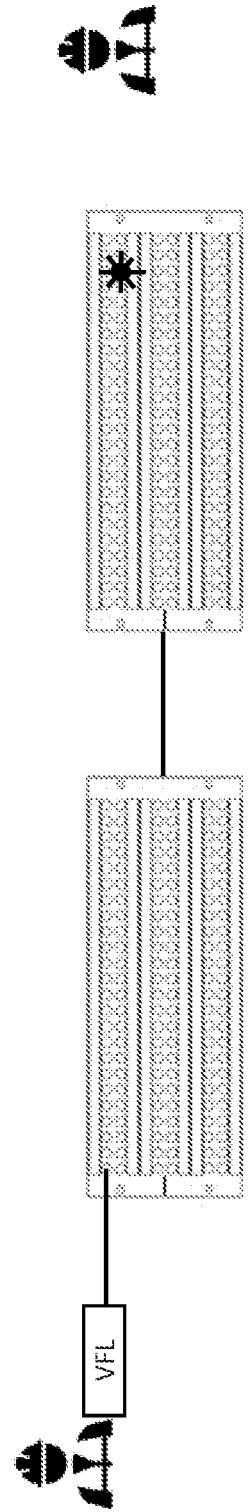
Fig. 1A (PRIOR ART)
Fig. 1B (PRIOR ART)

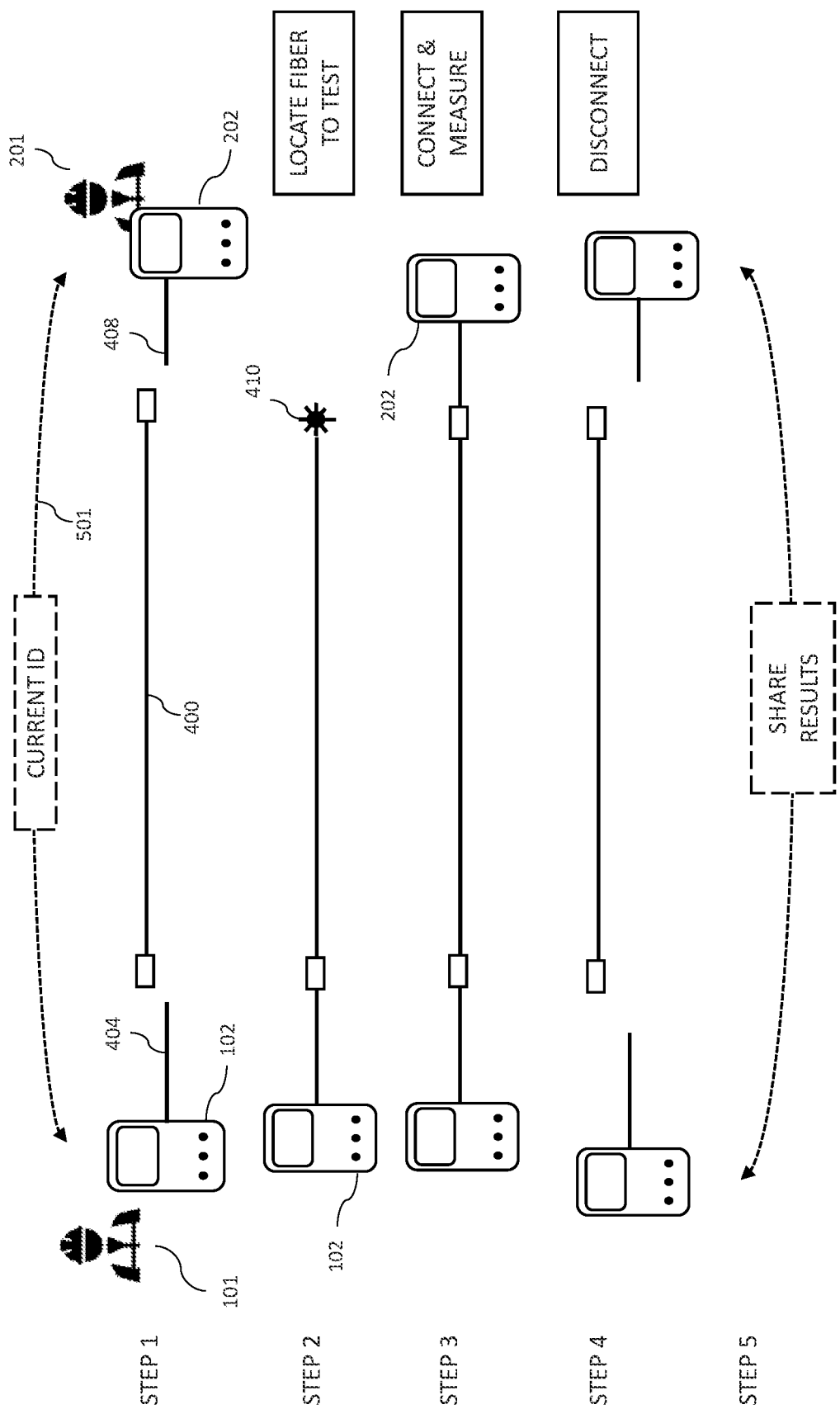

VISUAL FIBER FINDER FOR SEQUENCING OPTICAL FIBER TESTING

TECHNICAL FIELD

The present description generally relates to optical power loss measurement, and more particularly to test instruments, methods and procedures for measuring the optical power loss of optical fiber links under test, and particularly those part of an optical fiber buddle or fiber distribution panel comprising multiple optical fiber links.

BACKGROUND

Optical power loss measurements are crucial for proper management of network communication systems. To this end, the International Electrotechnical Commission (IEC) established standard method and procedures for measuring the optical power loss of optical-fiber links under test using a light source and a power meter (referred to as the Light Source Power Meter (LSPM) approach). For such LSPM methods, a light source unit and a power meter unit need to be connected at respective ends of the optical fiber link under test, which end are often remotely located from one another. In order to test a plurality of optical-fiber links, a user is required at each end of the optical fiber link in order to connect and disconnect the light source unit and the power meter unit to each optical fiber link to be tested.

As illustrated in FIG. 1A, in some example applications, the optical fiber communication links to be tested are accessible via fiber distribution panels (also known as "patch panels"). When the remote distribution panel is not well documented, this may be troublesome for the users to connect the light source unit and the power meter unit to the same optical fiber link. As illustrated in FIG. 1B, in such case, a visual fiber finder may be used to inject visible light into one end of the optical fiber link to be tested. At the other end, the user can look for visible light coming out of one port on the distribution panel to identify where to connect the test unit.

Synchronization between local and remote users may still represent a challenge. For example, in the case of FIGS. 1A and 1B, once the remote user has connected its test unit, the local user needs to be informed that he may disconnect the visual fiber finder from the optical fiber link and connect the test unit.

As illustrated in FIG. 2, some optical loss test sets are configured for the local and the remote test units to exchange messages over the optical fiber under test. But one drawback is that both units need to be connected to the same optical fiber for the communication to be established. Before they are actually connected (e.g., when using the visual fiber finder to find the right port), the users often have to resort to using their mobile phones to communicate with one another and synchronize their actions, which substantially impact test productivity.

There therefore remains a need for test instruments, methods and procedures for measuring the optical power loss of optical fiber links under test, which are adapted to assist users at opposite ends of the tested links in identifying where to connect the test units and in synchronizing their actions.

SUMMARY

There is provided a solution that aims to provide a more productive way to perform optical power loss measurements involving test units typically at different locations (which are also referred to herein as the local test unit and the remote test unit). In accordance with one aspect, the proposed solution involves the combination of a visual fiber finder source and a test light source on a same output port of the light source unit at one end of the optical fiber link under test. The visual fiber finder can be used to assist the user at the other end of the tested link in identifying where to connect the power meter unit. In some embodiments, once the power meter unit is connected to the optical fiber link to be tested, a signal can be exchanged between the two units, which won't be interrupted by a disconnection of the visual fiber finder to connect the test light source because both are connected simultaneously.

However, leaving the visual fiber finder active while optical power measurement is conducted may alter the results. In order to address this, it is herein proposed to interleave the visual fiber finder light with the test light in a cyclic sequence at the output of the light source unit so that both are not active at the same time. The power meter unit may lock on the measured signal (e.g., on a rising edge or on a falling edge) to determine when in the sequence to conduct an optical power measurement.

In accordance with one aspect, there is provided an optical power loss measurement system comprising:
a light source unit comprising:
  a visual fiber finder light source for generating visual fiber finder light;
  a test light source for generating power measurement test light;
  an output port to be connected to one end of an optical fiber link under test; and
  light source unit circuitry configured for generating an optical signal at said output port, which combines said visual fiber finder light and said test light together interleaved in a given cyclic sequence, whereby the visual fiber finder light is visible at the other end of the optical fiber link under test to assist a user in identifying where to connect a power meter unit; and
an optical power meter unit comprising:
  an input port to be connected to said other end of the optical fiber link under test; and
  an optical power meter assembly for measuring an optical power of said test light at said input port, said optical power meter assembly comprising an optical power detector; and
  optical power meter unit circuitry configured for controlling a time slot when said optical power of said test light is measured based on the optical signal detected at said optical power detector and said given cyclic sequence.

In accordance with one aspect, there is provided an optical power loss measurement method comprising:
a light source unit generating an optical signal on an output port to be connected at one end of an optical fiber link under test and comprising visual fiber finder light interleaved with test light in a given cyclic sequence, whereby the visual fiber finder light is visible at the other end of the optical fiber link under test to assist a user in identifying where to connect an optical power meter unit;
an optical power meter unit detecting said optical signal at the other end of the optical fiber link under test and controlling a time slot when said test light is to be measured, in accordance with said given cyclic sequence; and
said optical power meter unit measuring an optical power of said test light during said time slot.

In some embodiments, the optical power meter unit may further comprise an optical source and the light source unit may further comprise an optical detector used for the light source unit to detect a presence of the optical power meter unit on the other end of the link under test. Such presence detection may be used to further synchronize user's actions. Once a presence of the power measurement is detected, the light source unit may notify so to its user (e.g., by emitting a sound). And once the power measurement is completed, the remote user will disconnect the power meter unit from the link under test and the light source unit will stop receiving the presence signal. This may trigger the light source unit to notify so to its user (e.g., by emitting another sound), which user will then know that the power measurement is completed and that he may disconnect the light source unit to connect to another link to be test.

In some embodiments, the light source unit and power meter unit combo may be configured to measure a length of the link under test using a time-of-flight principle. As part of the length measurement method, the light source unit may send a light pulse in response to which the power meter unit also returns pulse signal response (which pulse may also be used as the presence signal). The light source unit detects the pulse signal response and determines a time lapse between the two pulse signals to calculate a length value therefrom.

In accordance with one aspect, there is provided optical power loss measurement method and system for that aims to provide a more productive way to perform optical power loss measurements involving test units typically at different locations. Visual fiber finder light can be used to assist the user at the other end of the optical fiber link under test in identifying where to connect the power meter unit. A visual fiber finder light and test light are combined on a same output port of a light source unit at one end of the optical fiber link under test wherein visual fiber finder light is interleaved with test light in a cyclic sequence so that both are not active at the same time. The optical power meter unit determines a time slot when to measure test light in accordance with the given cyclic sequence.

In the present description, the terms "light" and "optical" are used to refer to radiation in any appropriate region of the electromagnetic spectrum. More particularly, the terms "light" and "optical" are not limited to visible light, but can include, for example, the infrared wavelength range.

Further features and advantages of the present invention will become apparent to those of ordinary skill in the art upon reading of the following description, taken in conjunction with the appended drawings.

BRIEF DESCRIPTION OF THE DRAWINGS

FIG. 1A is a schematic illustrating a prior art optical power loss measurement method using a light source unit and an optical power meter unit remotely located from one another.

FIG. 1B is a schematic illustrating a prior art optical power loss measurement method wherein a visual fiber finder is used to identify where to connect the optical power meter unit.

FIG. 6 is a schematic illustrating an optical power loss measurement process which uses the optical power measurement system of FIG. 5, in accordance with one embodiment.

Figure 2:
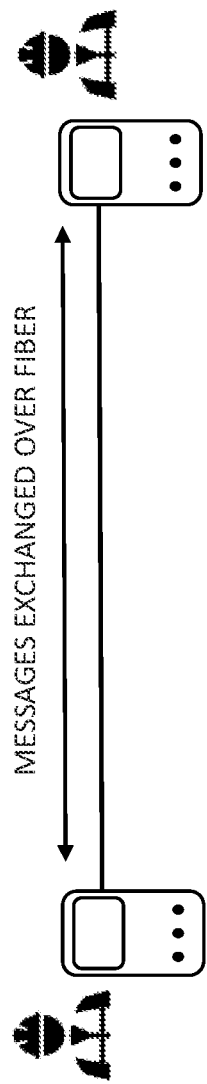
FIG. 2 is a schematic illustrating a prior art optical power loss measurement method wherein test units exchange messages over the optical fiber under test.

It will be noted that throughout the drawings, like features are identified by like reference numerals. In the following description, similar features in the drawings have been given similar reference numerals and, to not unduly encumber the figures, some elements may not be indicated on some figures if they were already identified in a preceding figure. It should be understood herein that elements of the drawings are not necessarily depicted to scale, since emphasis is placed upon clearly illustrating the elements and structures of the present embodiments. Some mechanical or other physical components may also be omitted in order to not encumber the figures.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments.

DETAILED DESCRIPTION

There is proposed a solution that aims to provide a more efficient way to perform measurements involving test units at different locations, referred to herein as the local and remote test units. The proposed solution involves merging a visual fiber finder and a test signal to the same optical output connector of at least one test unit.

Figure 3A:
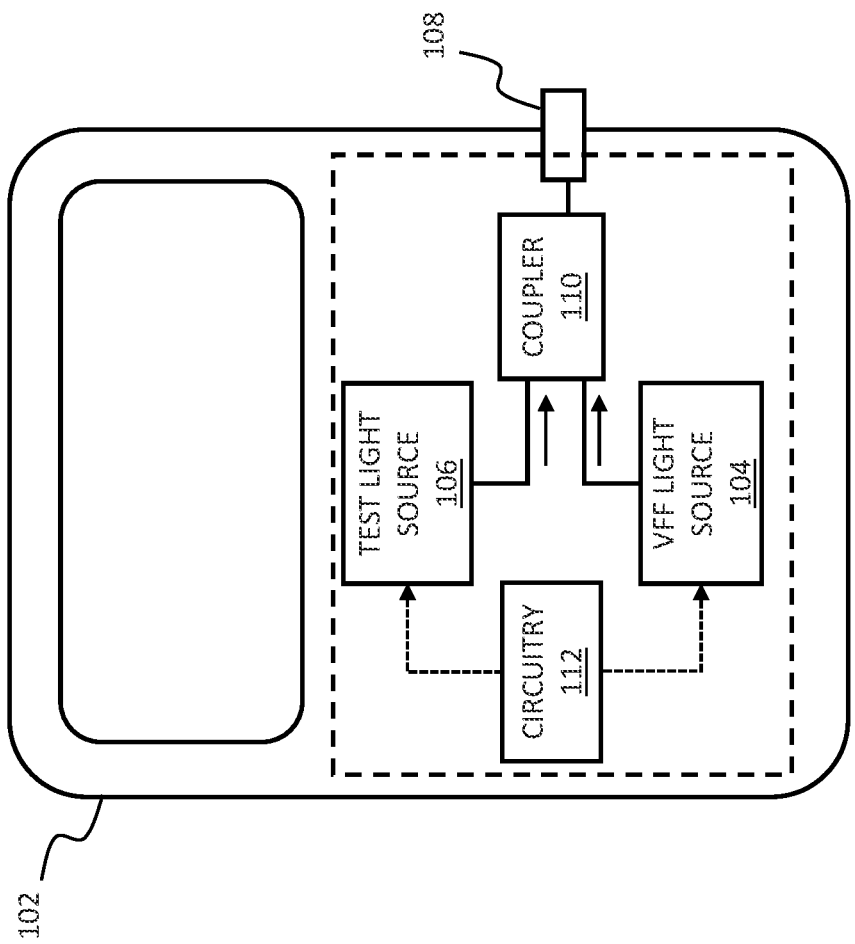
FIG. 3A is a block diagram illustrating a light source unit of an optical power loss measurement system in accordance with one embodiment wherein light from a single test light source is combined with visual fiber finder light.

FIG. 3A illustrates a configuration of such a light source unit 102 in accordance with one embodiment. The light source unit 102 comprises a visual fiber finder (VFF) light source 104 for generating visual fiber finder light and at least one additional light source 106 (also referred to herein as a test light source) for generating power measurement test light to be used for measuring the optical power loss of the optical fiber under test. The visual fiber finder source 104 and the at least one test light source 106 are connected toward an output port 108 of the light source unit 102 via an optical coupler 110 which may be based on wavelength division multiplexing or an optical power coupling. The light source unit 102 further comprises circuitry 112 (such as an FPGA, a microcontroller or any other digital logic circuit) used to control the activation of the VFF light source 104 and the test light source 106 so as to generate an optical signal at the output port 108 which comprises visual fiber finder light interleaved with test light in a given cyclic sequence (an example of which is described herein below with reference to FIGS. 8 and 9).

When the light source unit 102 is active and connected to the optical fiber link under test, visual fiber finder light is visible at the other end of the optical fiber link under test to assist the user in identifying where to connect an optical power meter unit. Due to the cyclic sequence, the visual fiber finder light may appear to the user as blinking (which makes no difference for him to see it).

Figure 3B:
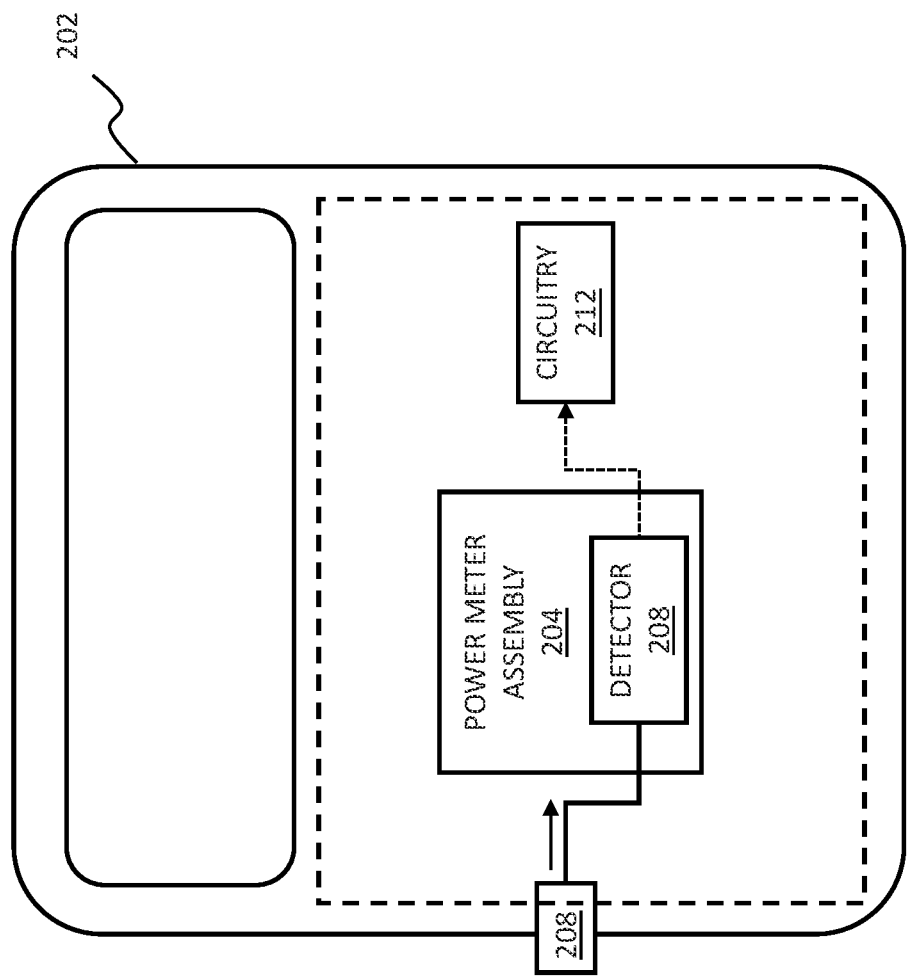
FIG. 3B is a block diagram illustrating an optical power meter unit in accordance with one embodiment.

FIG. 3B illustrates a configuration of an optical power meter unit 202 in accordance with one embodiment. The optical power meter unit 202 comprises an input port 208 to be connected to said other end of the optical fiber link under test and an optical power meter assembly 204 for measuring an optical power of test light at the input port 208 after propagation through the optical fiber link under test. The optical power meter assembly 204 comprises an optical power detector 208 as well as the necessary electronic for optical power measurement such as an amplification means and an analog-to-digital converter (not illustrated). The optical power meter unit 202 further comprises circuitry 212 configured for controlling a time slot when to measure optical power test light based on the optical signal optical signal detected at the optical power detector 208 and the given cyclic sequence of the optical signal (described herein below with reference to FIGS. 8 and 9).

Figure 4:
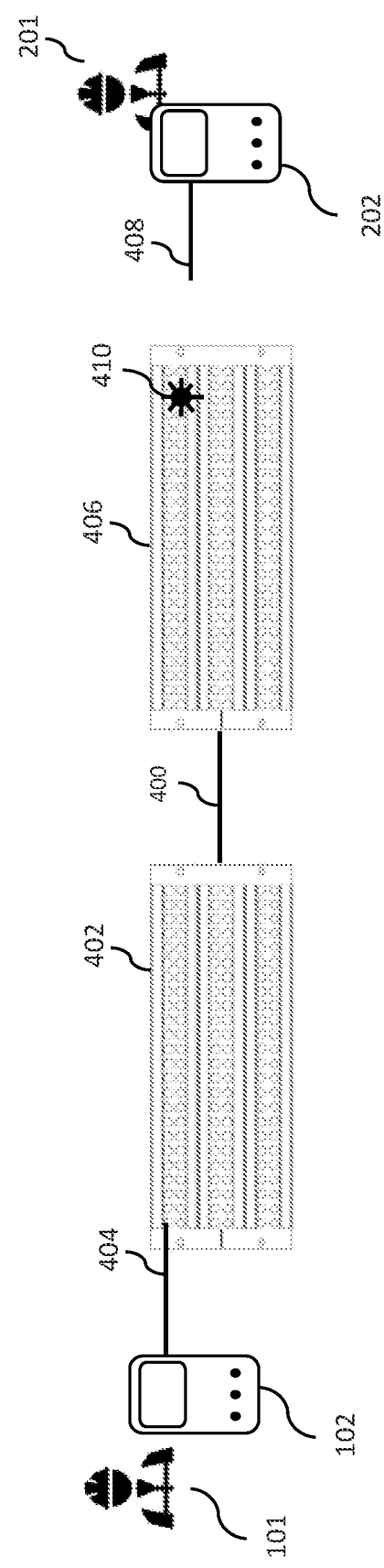
FIG. 4 is a schematic illustrating an optical power loss measurement method in accordance with one embodiment which uses the light source unit of FIG. 3.

FIG. 4 illustrates an example operation of the light source unit 102 including the visual fiber finder source 104, in accordance with one embodiment. The local user 101 connects the output port 108 of the light source unit 102 toward the fiber infrastructure to be tested, e.g., on a local patch panel 402, via a launch fiber 404. The light source unit 102 is either already on or is turned on.

The light source unit 102 then generates an optical signal at its output port 108 and toward the optical fiber link 400 under test. The optical signal comprises visual fiber finder light interleaved with test light in a given cyclic sequence. The visual fiber finder light is then made visible at the other end of the optical fiber link under test to assist a user in identifying where to connect an optical power meter unit 202.

A remote user 201 can then locate the optical fiber link under test by viewing visual fiber finder light exiting one connector 410 on the remote fiber infrastructure, e.g., at the remote patch panel 406. Via a patch cord 408, he can then connect the remote test unit 202 toward the optical fiber to be tested, i.e., at the correct location on the remote patch panel 406, to carry on with the optical power measurement.

It will be understood that overall test procedure may further comprise a power reference step as known in the art of optical power loss measurement (which need not be described herein in detail).

Communication Between Units: Cloud Communication Configuration

Optionally, a wireless communication link may be established between the local unit 102 and the remote unit 202. As mentioned hereinabove, some prior art Optical Loss Test Sets (OLTS) use the fiber under test to communicate. Such communication requires both units to be connected to the same optical fiber for a communication to be established.

Figure 5:
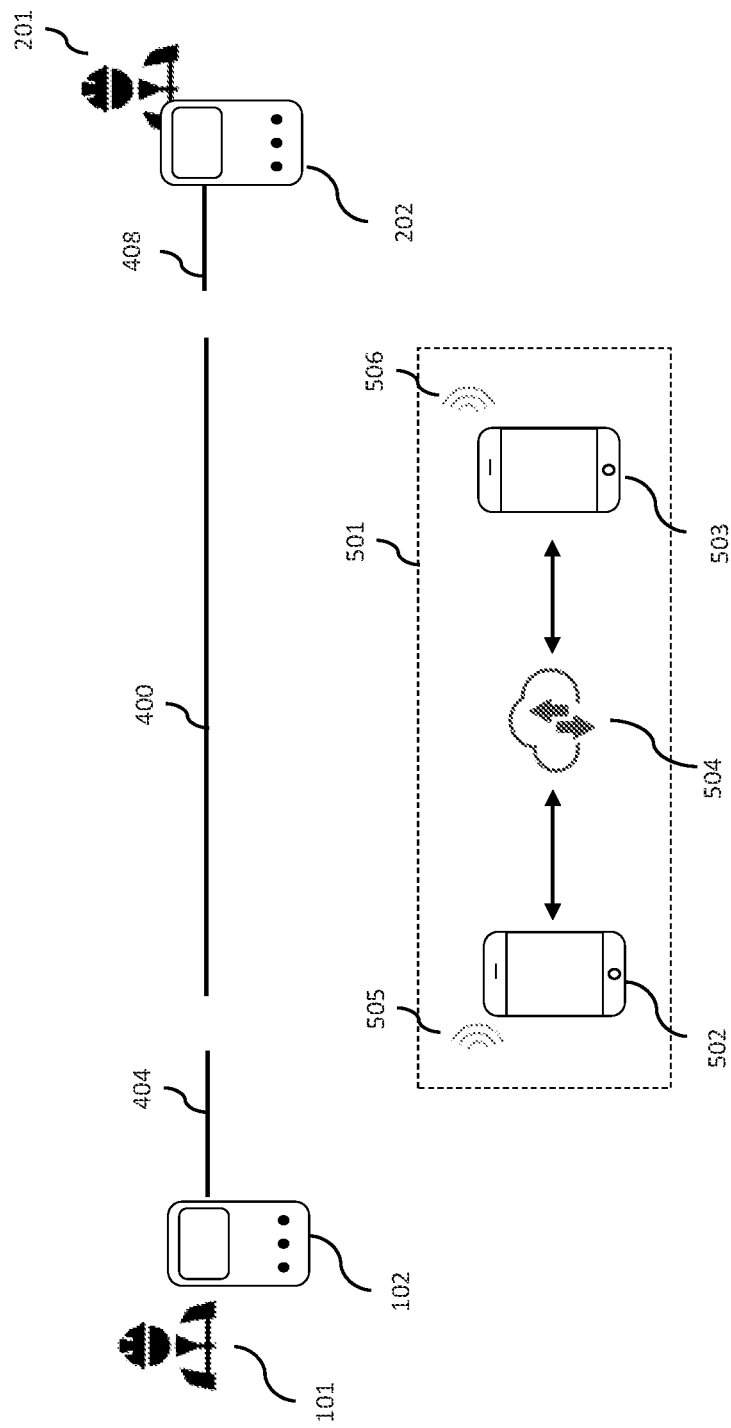
FIG. 5 is a schematic illustrating an optical power loss measurement system and method wherein test units further exchange messages over a wireless communication link between the test units.

As illustrated in FIG. 5, there is proposed to establish an optional wireless communication link between the test units 102, 109. In one scenario, the local user 101 operates a local test unit 102 to test an optical fiber link 400 with the help of a remote user 201 operating the remote test unit 202. A wireless communication bridge 501 may be established between the test units 102, 202 using respective smartphones 502, 503 of the local and remote users 101, 201. Each test unit 102, 109 connects to its respective smartphone 502, 503 a wireless connection 505, 506 using Wi-Fi, Bluetooth™ or any other wireless communication technology. The smartphones 502, 503 may communicate with one another via internet communication or a cloud infrastructure 504 for example, e.g., using a Wi-Fi or mobile network, to complete the communication bridge 501.

Once the wireless communication bridge 501 is established, the test units 102, 202 can communicate with one another even if not connected or not yet connected to the same optical fiber link 400.

First Test Process Example

FIG. 6 illustrates an optical power loss measurement process which may be carried on using the optical power loss measurement system of FIG. 5 comprising a light source unit 102 at a local site and an optical power meter unit 202 at a remote site, together used to measure an optical power loss of the optical fiber link to be tested 400.

In step 1, a wireless communication bridge 501 is established between test units 102, 202 as described with reference to FIG. 5. Via communication between the test units 102, 202, both test units 102, 202 selects a common current test ID associated with the optical fiber link to be tested.

In step 2, the local user 101 connects the unit 102 to one end of the optical fiber link 400 to be tested. Visual fiber finder light is then made visible at the other end of the optical fiber link 400 to assist user 201 in identifying the right optical fiber port where to connect the remote test unit 202 based on visual fiber finder light exiting that port.

In step 3, the remote user 201 connects the remote test unit 202 to the optical fiber link 400 via the located remote port and launches a measurement.

In step 4, the test results are stored (either automatically after completion or once requested by the remote user 201 via the user interface of the remote test unit 202). Via the wireless communication bridge 501, the remote test unit 202 then transmits to the local test unit 102 a notification that the test is completed. Optionally, the remote test unit 202 may also transmit the test results to the local test unit 102 via the wireless communication bridge 501. The local test unit 102 then notifies the user 101 that the test is completed, e.g., via its user interface or a sound notification for example.

In step 5, both users 101, 201 disconnect their respective test units 102, 202 from the optical fiber link 400 and we go back to step 2 to perform the next test, e.g., test the next optical fiber link.

The wireless communication bridge 501 may therefore provide a synchronization mechanism between the test units 102, 202, which allows informing both users when a test is completed.

Some further automation of the test process may optionally be implemented. For example, in step 3, upon the remote unit 202 detecting at its input port a presence of the optical signal emitted by the local unit 102, the remote unit 202 may automatically launch the optical power measurement, without user intervention. And at step 4, upon completion of the measurement, the test results may be automatically stored and automatically shared by the remote test unit 202 to the local test unit 102 via the wireless communication bridge 401, thereby completing the test process.

Connection Feedback Between Test Units

In the embodiment of FIG. 4, unless a communication is established between users 101 and 201 the user 101 has no other means or feedback to determine whether the optical power measurement is completed at the remote end. A communication (such as a wireless communication bridge as described with reference to FIG. 5 or a voice or text communication using their respective mobile devices 502, 503) is then needed for the user 101 to know when to switch to the next optical fiber link to be tested. In order to optimize the test workflow, an optional connection feedback may be further be established from the remote test unit 202 to the local test unit 102. Such feedback may comprise a presence signal sent by the remote test unit 202 over the optical fiber link under test and detected by the local test unit 102.

Figure 7A:
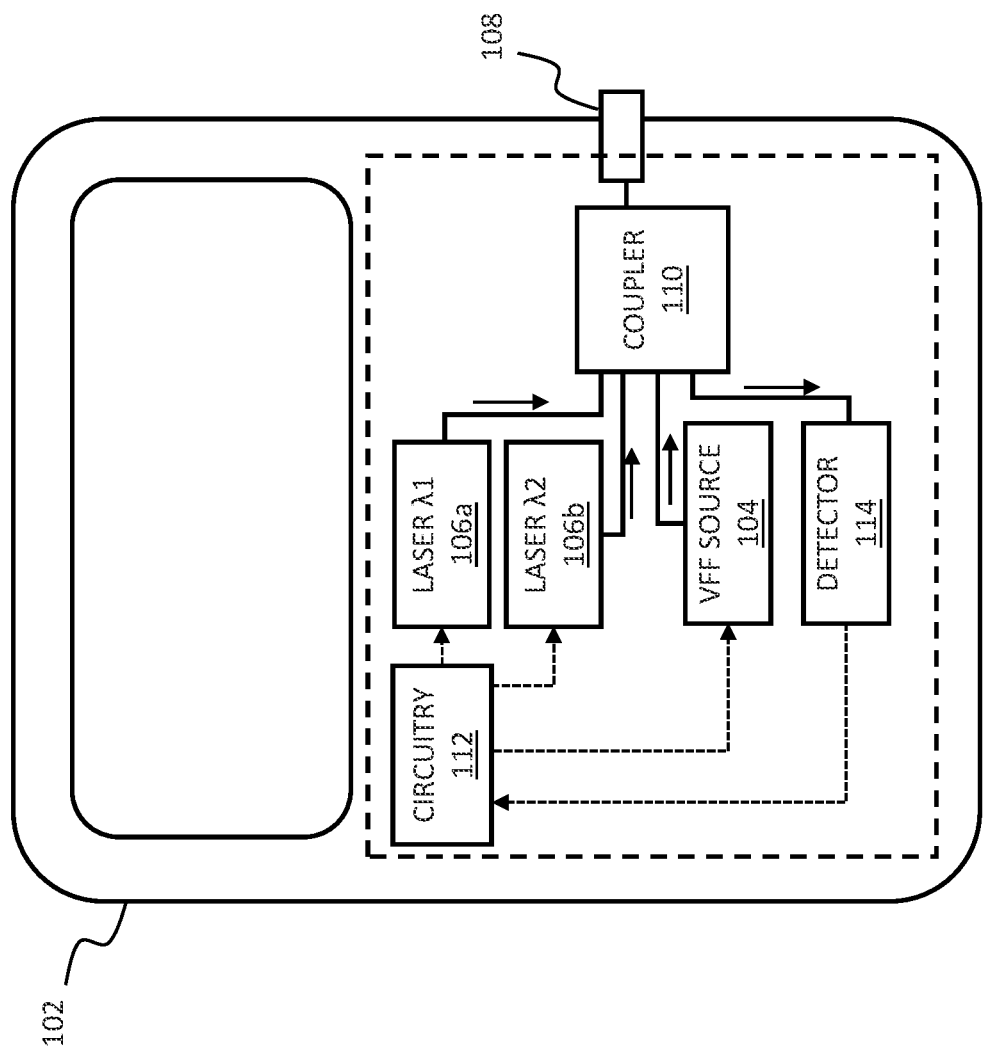
FIG. 7A is a block diagram illustrating a light source unit in accordance with another embodiment comprising an optical detector to provide feedback between the two test units using a presence signal.

FIG. 7A illustrates an embodiment of a light source unit 102 further comprising an optical detector 114 to detect such presence signal emitted by the optical power meter unit 202 in order to provide enhanced feedback between the two test units 102, 202. In this embodiment, the light source unit 102 further comprises multiple test light sources 106a, 106b, combined with a visual fiber finder light source 104, in order to enable optical power loss measurement at various wavelengths $\lambda 1$, $\lambda 2$. The visual fiber finder source 104, the test light sources 106a, 106b and the optical detector 114 are all connected toward the output port 108 via an optical coupler 110 which may be based, e.g., on wavelength division multiplexing or an optical power coupling. The light source unit 102 further comprises circuitry 112 used to control the activation of the VFF light source 104 and the test light sources 106a, 106b in turn so as to generate an optical signal at the output port 108 (an example of which is described herein below with reference to FIGS. 8 and 9).

Circuitry 112 may further be configured to generate a connection status notification to user 101 upon detection of the presence signal and a disconnection status notification when the presence signal is no longer detected. Such feature allows the user 101 to know when testing is completed at the remote end, allowing him to then switch to the next optical fiber link to be tested.

Figure 7B:
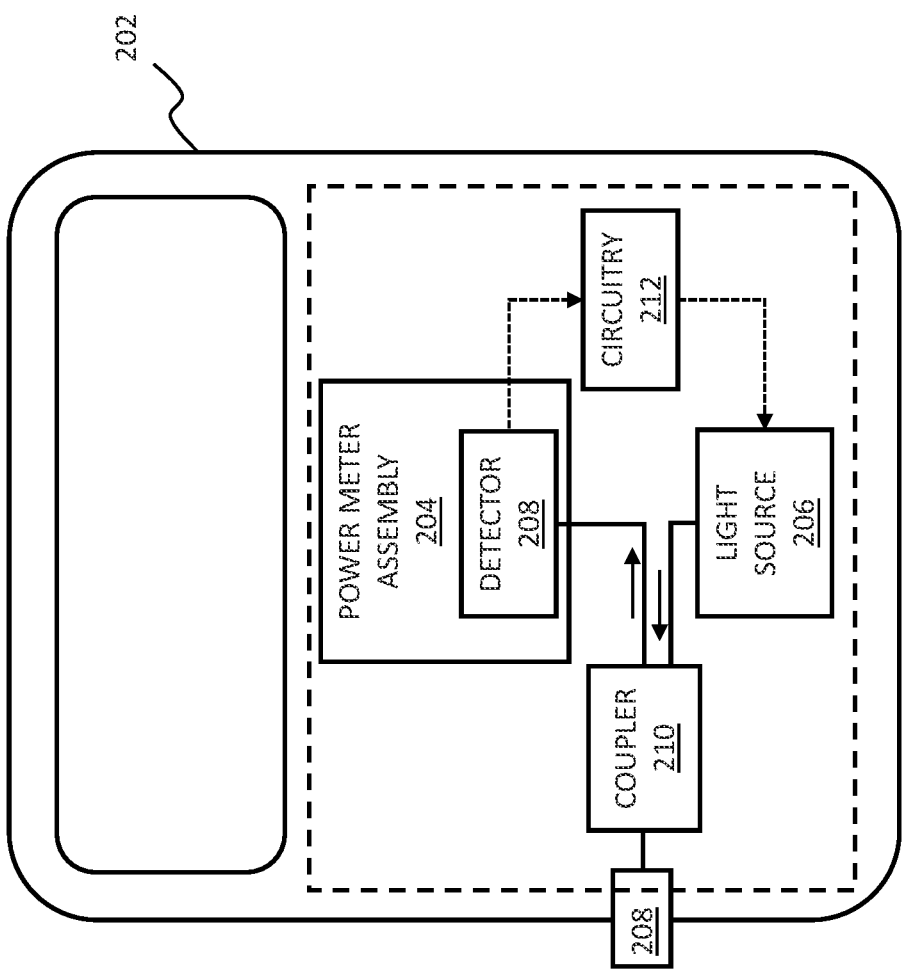
FIG. 7B is a block diagram illustrating an optical power meter unit in accordance with one embodiment that is adapted to send a presence signal over the optical fiber link under test.

FIG. 7B illustrates an embodiment of an optical power meter unit 202 further comprising a light source 206 to generate a presence signal to provide enhanced feedback between the two test units 102, 202. The optical power meter unit 202 further comprises an optical coupler 210 which may be based, e.g., on wavelength division multiplexing or an optical power coupling. Although the light source 206 may be activated in continuous, in some embodiments, the circuitry 212 may be configured to activate the light source 206 to produce the presence signal only upon detection of an optical signal at the optical power detector 208. Such feature may be used to save power as well as to measure a length of the optical fiber link under test from detection of the presence signal by the light source unit 102 using a time-of-flight calculation. More specifically, the optical power meter unit circuitry is optimized to activate the light source 206 to produce the presence signal upon detection of a rising edge in the optical signal received at input port 208. The light source unit 102 may determine a length of the optical fiber link under test from the time lapse between the rising edge in the optical signal and the detection of the presence signal.

Cyclic Sequence:

It should be mentioned that the optical power of the visual fiber finder light should generally be maximized for optimal visibility by the remote user 201. On the other hand, optical power of test light is selected to obtain a desired dynamic range for the optical power measurement. That is, for most applications, the visual fiber finder light may have to be significantly more powerful than the test light. Accordingly, for power measurements not to be biased by the presence of visual fiber finder light on the optical fiber, the visual fiber finder light source may need to be turned off during power measurement.

Figure 8:
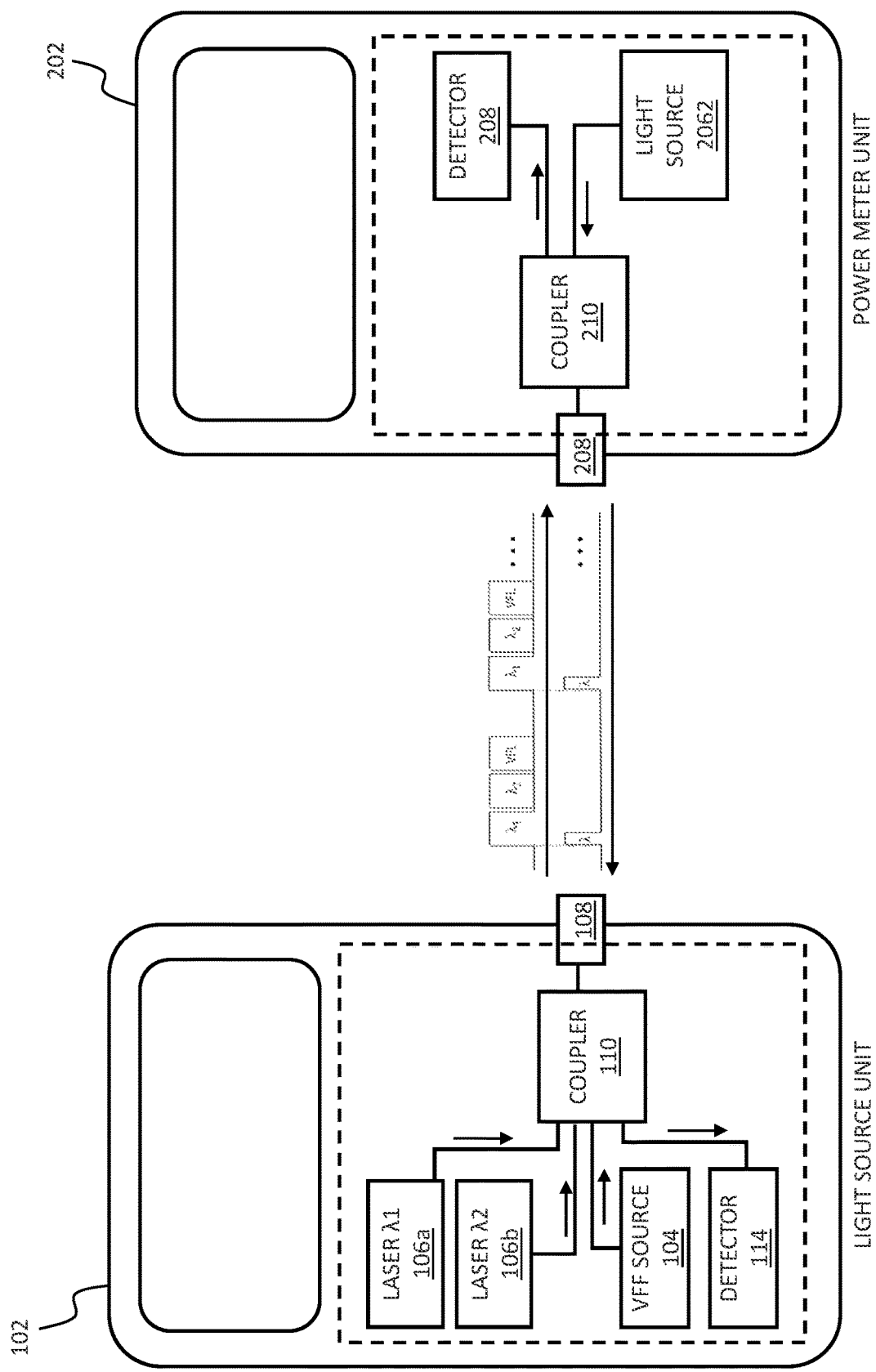
FIG. 8 is a schematic illustrating an optical signal test sequence along with an optical power loss measurement system, in accordance with one embodiment.
Figure 9:
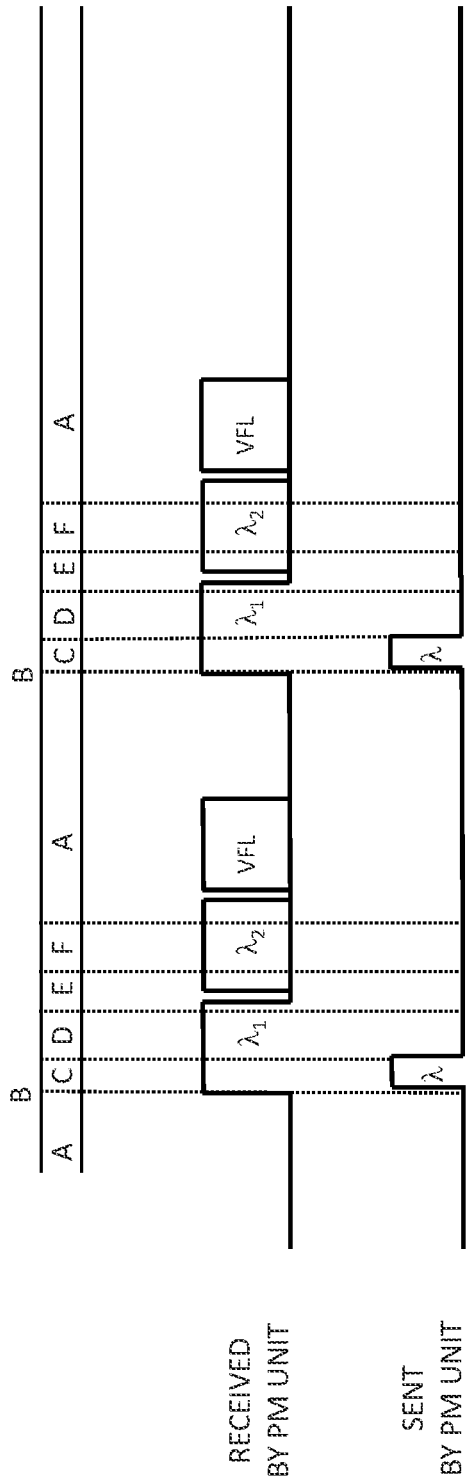
FIG. 9 is a schematic illustrating an optical power loss measurement sequence of an optical power meter unit, in accordance with one embodiment.

Referring to FIGS. 8 and 9, in order to address this constraint, there is provided a solution that involves a time division multiplexed sequence wherein the test light source(s) and the visual fiber finder source are activated in turn according to a predetermined cyclic sequence, so that a single one is active at a time. The power meter unit 202 may synchronize the power measurement sequence to the optical signal cycle (e.g., based on its rising or falling edge) so as to record power measurement over the appropriate time period, i.e., when the test light source is active.

Any time the light source unit 102 is active and connected to the optical fiber link under test, visual fiber finder light is visible at the other end of the optical fiber link under test to assist the user in identifying where to connect an optical power meter unit. Due to the cyclic sequence, the visual fiber finder light may appear to the user as blinking (which makes no difference for him to see it).

As described hereinabove, the light source unit 102 may comprise one or more test light sources 106a, 106b. In the example of FIGS. 8 and 9, it comprises two test light sources 106a, 106b ($\lambda 1$ and $\lambda 2$ respectively) and a single visual fiber finder source 202. Some features (e.g., circuitry) are not shown in FIG. 8 only to simply the figure.

FIGS. 8 and 9 both illustrate an exemplary cyclic sequence in accordance with one embodiment. In this embodiment, first test light $\lambda 1$, second test light $\lambda 2$, visual fiber finder light and no light are interleaved in this order with about the same active time (e.g., 250 ms) for such portion of the sequence. Of course, it will be appreciated that the activation time need not be the same for each source and that these activation times may vary and be optimized to the specific application. Of course, the order of the signals may also vary (e.g., visual fiber finder light may be sent before or after test light or even in-between $\lambda 1$ and $\lambda 2$).

It will also be understood that the number of test light sources may vary and that the power level of the interleaved signals may be mutually different.

In this non-limiting example, the length of one period of the cyclic sequence is 1000 ms and one cycle of the cyclic sequence comprises a visual fiber finder state wherein only visual fiber finder light is present (250 ms), a first test light state wherein only first test light $\lambda 1$ is active (250 ms), a second test light state wherein only second test light λ2 is active (250 ms) and an off state wherein light is absent (250 ms). Visual fiber finder light is active during 250 ms per period, i.e., 25% of the time. Visual fiber finder light is therefore blinking rate at a frequency of 1 Hz.

As described hereinabove, the optical power meter unit 202 may further send a presence signal back to the light source unit 102 upon detection of an optical signal at the optical power detector 208 (herein upon detection of a rising edge on the optical signal).

FIG. 9 further illustrates the operation sequence of the light source unit 102 and the optical power meter unit 202, in accordance with one embodiment.

As to the light source unit 102, its operation is independent from any signal received from the optical power meter unit 202, apart from the any optional time-of-flight calculation. It simply emits first test light λ1, second test light λ2, visual fiber finder light and no light in accordance with a predetermined cyclic sequence.

On the other hand, the optical power meter unit 202 synchronizes its operation on the optical signal as detected:

Its operation sequence begins in stage A where it looks for a first rising edge on the detected optical signal.

In B, a rising edge is detected.

In stage C, upon detection of a rising edge, circuitry 212 of the optical power meter unit 202 triggers the emission of a presence signal in the form of a light pulse which may optionally be used by the light source unit 102 to measure a length of the optical fiber link under test. More specifically, the length of the optical fiber link under test may be derived from a delay between the rising edge on the emitted optical signal and the rising edge of the pulse on the detected presence signal. A connection status notification (such as a notification on the user interface or a sound notification) may also be generated.

Also in stage C, upon detection of a rising edge, circuitry 212 of the optical power meter unit 202 may trigger the launch of a clock from which to determine the time slot(s) when to make the optical power measurement. The time slots are given based on the cyclic sequence as known or preconfigured in the optical power meter unit 202. It will be understood that these time slots may be hardcoded or configured in circuitry 212 as a function of the known hardcoded or configurable timing of the cyclic sequence.

Stage D corresponds to such a first time slot. A given time lapse after the rising edge, the circuitry 212 of the optical power meter unit 202 begins to record and average optical power measurement for test light λ1 and stops after another given time lapse.

In stage E, the optical power meter unit 202 waits for the next time slot when to make measurement.

Stage F corresponds to a second time slot. A given time lapse after the rising edge, the circuitry 212 of the optical power meter unit 202 begins to record and average optical power measurements for test light λ2 and stops after another given time lapse.

All measurements are then completed and the optical power meter unit 202 goes back to stage A to wait for another rising edge.

As known in the art, data averaging is typically used to reduce the measurement noise on optical power measurements. It will therefore be understood that optical power measurement data may be averaged over a single or multiple time slots if necessary or beneficial.

Second Test Process Example

Figure 10:
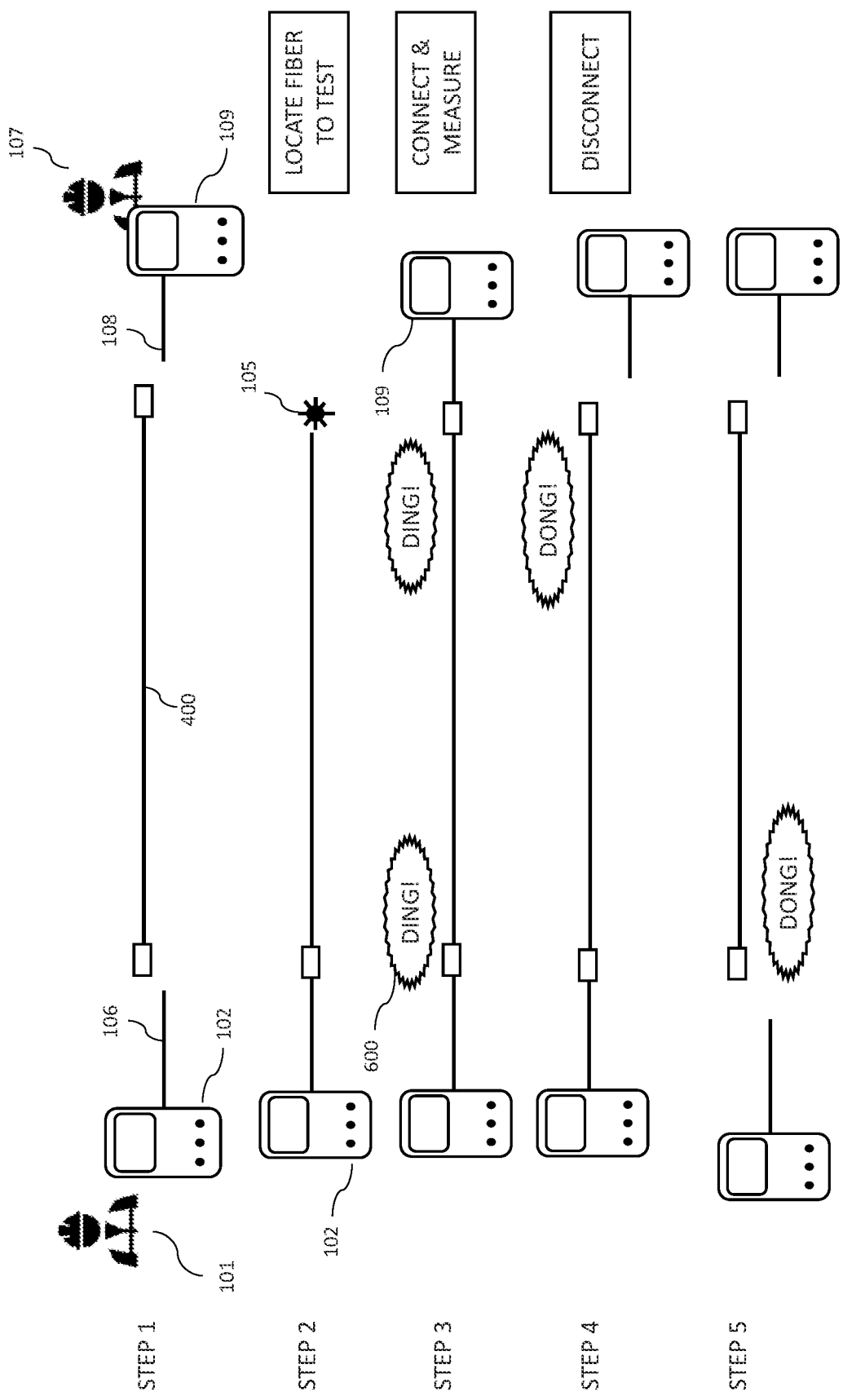
FIG. 10 is a schematic illustrating an optical power loss measurement process which uses the optical power measurement system of FIG. 8, in accordance with one embodiment.

FIG. 10 illustrates an optical power loss measurement process which may be carried on using the optical power loss measurement system of FIG. 8 comprising a light source unit 102 at a local site and an optical power meter unit 202 at a remote site, together used to measure an optical power loss of the optical fiber link to be tested 400.

In step 1, a wireless communication bridge 501 between test units 102, 202 is optional but may be used to select test ID associated with the optical fiber link to be tested.

In step 2, the local user 101 connects the unit 102 to one end of the optical fiber link 400 to be tested. Visual fiber finder light is then made visible at the other end of the optical fiber link 400 to assist user 201 in identifying the right optical fiber port where to connect the remote test unit 202 based on visual fiber finder light exiting that port.

In step 3, the remote user 201 connects the remote test unit 202 to the optical fiber link 400 via the located remote port. Upon connection, the remote test unit 202 detects a presence of the optical signal emitted by the local test unit 102 and the local test unit 102 detects the presence signal emitted by the remote test unit 202, and both units 120, 202 generate a connection status notification to user 101, such as a sound notification ("ding") or a notification on the user interface.

Also, in step 3, optical power measurement is launched (automatically or upon user interaction) and performed as described with reference to FIG. 8.

In step 4, on completion of the optical power measurement the test results are stored (either automatically after completion or once requested by the remote user 201 via the user interface of the remote test unit 202). Also, the remote test unit 202 notifies the user 201 that the test is completed by generating a completion status notification, such as a sound notification ("dong") or a notification on the user interface. The user 202 then disconnects the remote test unit 202 from the optical communication link.

In step 5, once the remote test unit is disconnected, the local test unit 102 stops receiving the presence signal. Upon detection that the presence signal is no longer detected, the local test unit 102 generates a disconnection status notification, such as a sound notification ("dong") or a notification on the user interface. The user 102 then disconnects the local test unit 102 from the optical communication link.

Optionally, the remote test unit 202 may also transmit the test results to the local test unit 102 via the wireless communication bridge 501.

We then go back to step 2 to perform the next test, e.g., test the next optical fiber link.

This embodiment advantageously allows both users to connect and disconnect the test units 102, 202 from the optical fiber links to be tested without requiring any wireless communication between the units or any voice or text communication between the users 101, 201.

Example of Test Unit Architecture

Figure 11:
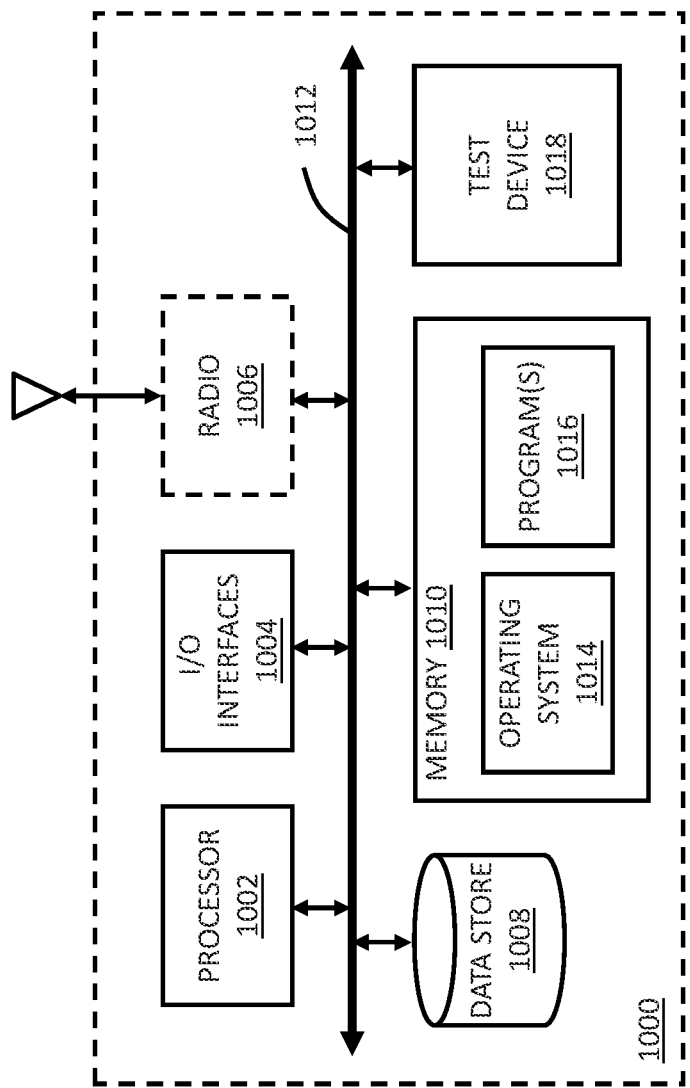
FIG. 11 is a block diagram illustrating an example architecture of a test unit of the system of FIG. 5 or 8.

FIG. 11 is a block diagram of a test unit 1000 which may embody the light source unit 102 or the optical power meter unit 202 of the systems of FIG. 5 or 8. The test unit 1000 may comprise a digital device that, in terms of hardware architecture, generally includes a processor 1002, input/output (I/O) interfaces 1004, an optional radio 1006, a data store 1008, a memory 1010, as well as an optical test device as described with reference to FIG. 3A, 3B, 7A or 7B. It should be appreciated by those of ordinary skill in the art that FIG. 11 depicts the test unit 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the test unit 1000 is in operation, the processor 1002 is configured to execute software stored within the memory 1010, to communicate data to and from the memory 1010, and to generally control operations of the test unit 1000 pursuant to the software instructions. In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can be used to display a graphical user interface (GUI) that enables a user to interact with the test unit 1000 and/or output test results.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication. The data store 1008 may be used to store data, such as measurement data files. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 11, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The program(s) 1016 may include various applications, add-ons, etc. configured to provide end-user functionality with the test unit 1000. For example, example programs 1016 may include a web browser to connect with a server for transferring measurement data files, a dedicated test application configured to control the operation of the test unit 1000 and display a GUI related to the test unit 1000.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the test unit 1000 via the radio 106. In such cases, at least some of the programs 1016 may be located in a memory of such a mobile device, for execution by a processor of the physically distinct device. The mobile may then also include a radio and be used to transfer measurement data files toward a remote test application residing, e.g., on a server.

It should be noted that the test unit shown in FIG. 11 is meant as an illustrative example only. Numerous types of computer systems are available and can be used to implement the test units.

The embodiments described above are intended to be exemplary only and one skilled in the art will recognize that numerous modifications can be made to these embodiments without departing from the scope of the invention. For example, in other embodiments, the coupler 110 could be replaced by an optical switch configured to alternately couple visual fiber finder light and power measurement test light toward the optical output port 108 for injection into the optical fiber link under test and a controller for controlling the optical switch for interleaving visual fiber finder light and power measurement test light in a cyclic sequence.

The embodiments described above are intended to be exemplary only. The scope of the invention is therefore intended to be limited solely by the appended claims.

The invention claimed is:

1. An optical power loss measurement system comprising:
   a light source unit comprising:
      a visual fiber finder light source for generating visual fiber finder light;
      a test light source for generating power measurement test light;
      an output port to be connected to one end of an optical fiber link under test; and
      light source unit circuitry configured for generating an optical signal at said output port, which combines said visual fiber finder light and said test light together interleaved in a given cyclic sequence, whereby the visual fiber finder light is visible at the other end of the optical fiber link under test to assist a user in identifying where to connect a power meter unit; and
   an optical power meter unit comprising:
      an input port to be connected to said other end of the optical fiber link under test; and
      an optical power meter assembly for measuring an optical power of said test light at said other end, said optical power meter assembly comprising an optical power detector; and
      optical power meter unit circuitry configured for controlling a time slot when said optical power of said test light is measured based on the optical signal detected at said optical power detector and said given cyclic sequence.

2. The optical power loss measurement system as claimed in claim 1, wherein said light source unit comprises:
an optical coupler configured to couple said visual fiber finder light and said power measurement test light together toward the optical output port for injection into the optical fiber link under test; and
said light source unit circuitry being configured for activating said visual fiber finder light source and said test light source in turn so as to interleave said visual fiber finder light and said power measurement test light in said given cyclic sequence.

3. The optical power loss measurement system as claimed in claim 1, wherein said light source unit comprises:
an optical switch configured to alternately couple visual fiber finder light and power measurement test light toward the optical output port for injection into the optical fiber link under test; and
a controller for controlling said optical switch for interleaving said visual fiber finder light and said power measurement test light in said given cyclic sequence.

4. The optical power loss measurement system as claimed in claim 1, wherein each cycle of said cyclic sequence comprises a visual fiber finder state wherein only said visual fiber finder light is present, a test light state wherein only said test light is active and an off state wherein light is absent.

5. The optical power loss measurement system as claimed in claim 1, wherein said circuitry of said optical power meter unit is configured to detect a rising edge of said optical signal and determine said time slot when to measure said optical power test light from said rising edge.

6. The optical power loss measurement system as claimed in claim 5, wherein said optical power meter unit further comprises a light source and wherein said optical power meter unit circuitry is configured to activate said light source to produce a presence signal upon detection of said rising edge.

7. The optical power loss measurement system as claimed in claim 6, wherein said light source unit further comprises an optical detector to detect said presence signal and wherein said light source unit circuitry is further configured to generate a first connection status notification upon detection of said presence signal and a first disconnection status notification when said presence signal is no longer detected.

8. The optical power loss measurement system as claimed in claim 7, wherein said optical power meter unit circuitry is further configured to generate a second connection status notification upon detection of said optical signal and a second disconnection status notification when said optical signal is no longer detected.

9. An optical power loss measurement method comprising:
generating visual fiber finder light using a visual fiber finder light source of a light source unit;
generating power measurement test light using a test light source of a light source unit;
using a light source unit circuitry of a light source unit, generating an optical signal on an output port to be connected at one end of an optical fiber link under test, which optical signal combines visual fiber finder light and power measurement test light together interleaved in a given cyclic sequence, whereby the visual fiber finder light is visible at the other end of the optical fiber link under test to assist a user in identifying where to connect an optical power meter unit;
using an optical power meter assembly of an optical power meter unit, measuring an optical power of said test light via an input port to be connected to said other end of the optical fiber link under test, said optical power meter assembly comprising an optical power detector; and
using optical power meter unit circuitry of said optical power meter unit, controlling a time slot when said optical power of said test light is measured based on the optical signal detected at said optical power detector and said given cyclic sequence.

10. The optical power loss measurement method as claimed in claim 9, wherein each cycle of said cyclic sequence comprises a visual fiber finder period wherein only said visual fiber finder light is active, a test light period wherein only said test light is active and an off period wherein light is absent.

11. The optical power loss measurement method as claimed in claim 9, further comprising said optical power meter unit detecting a rising edge of said optical signal and determining said time slot when to measure said optical power test light from said rising edge.

12. The optical power loss measurement method as claimed in claim 11, further comprising said optical power meter unit producing a presence signal upon detection of said rising edge.

13. The optical power loss measurement method as claimed in claim 12, further comprising said light source unit detecting said presence signal and generating a first connection status notification upon detection of said presence signal and a first disconnection status notification when said presence signal is no longer detected.

14. The optical power loss measurement method as claimed in claim 13, further comprising said optical power meter unit generating a second connection status notification upon detection of said optical signal and a second disconnection status notification when said optical signal is no longer detected.

* * * * *